United States Patent [19]

Alewitz

[11] 4,085,950
[45] *Apr. 25, 1978

[54] GAS RISER APPARATUS AND METHOD

[75] Inventor: Sam Alewitz, Painesville, Ohio

[73] Assignee: Perfection Corporation, Madison, Ohio

[*] Notice: The term of this patent subsequent to Oct. 26, 1993, has been disclaimed.

[21] Appl. No.: 735,106

[22] Filed: Oct. 22, 1976

Related U.S. Application Data

[63] Continuation of Ser. No. 495,200, Aug. 6, 1974, and a continuation-in-part of Ser. No. 349,681, Apr. 10, 1973.

[51] Int. Cl.² ............................................. F16L 21/00
[52] U.S. Cl. ....................................... 285/45; 285/138
[58] Field of Search ................ 285/45, 55, 133 R, 138

[56] References Cited

U.S. PATENT DOCUMENTS

| 3,922,008 | 11/1975 | Stiner et al. | 285/41 |
| 3,944,262 | 3/1976 | Stiner et al. | 285/249 X |
| 4,005,880 | 2/1977 | Anderson et al. | 285/256 X |

Primary Examiner—Wayne L. Shedd
Attorney, Agent, or Firm—Fay & Sharpe

[57] ABSTRACT

A gas riser apparatus and method for conducting gas from a source of supply to a delivery point such as a meter or the like. The gas riser apparatus is defined by a double walled conduit including an inner tubular member and an outer tubular member. Sealing structure is provided at the double walled conduit for the purpose of sealing the riser apparatus. The method of the invention is directed to method steps for conducting gas from a source of supply below ground level to a delivery point above ground level.

2 Claims, 5 Drawing Figures

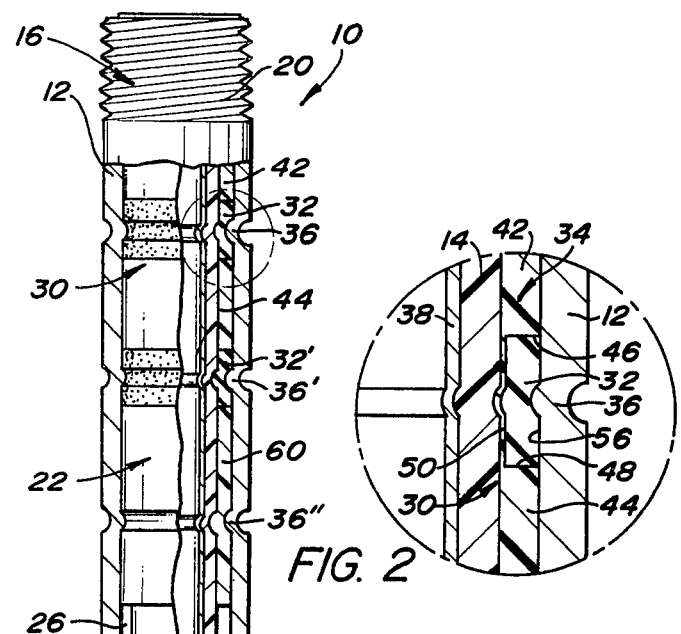

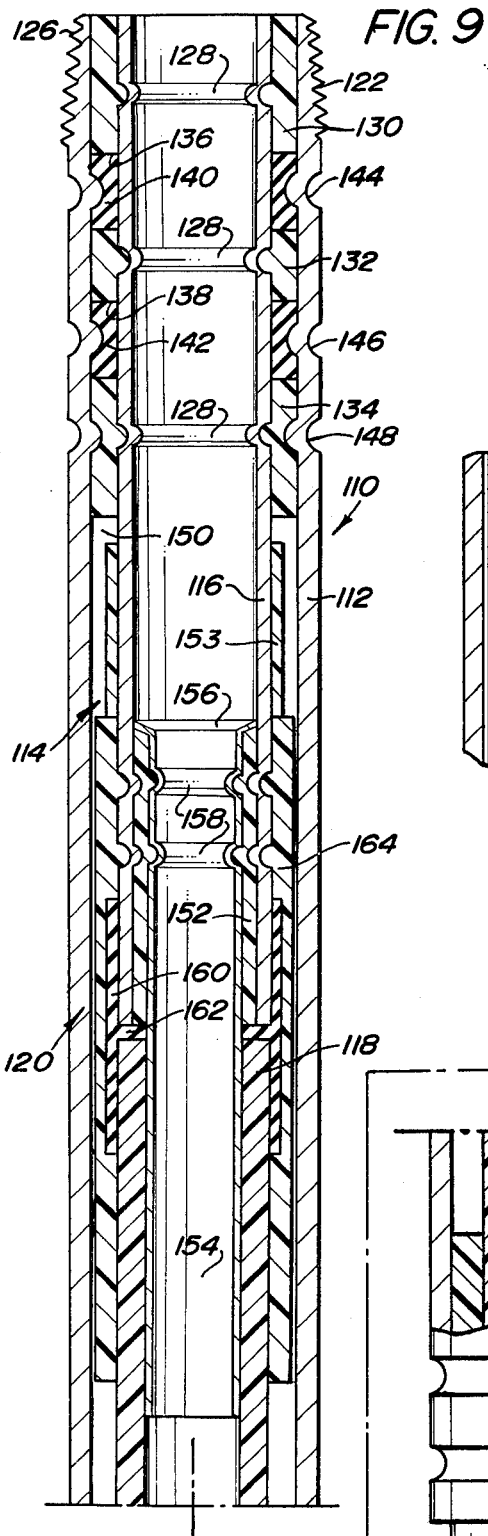
FIG. 9
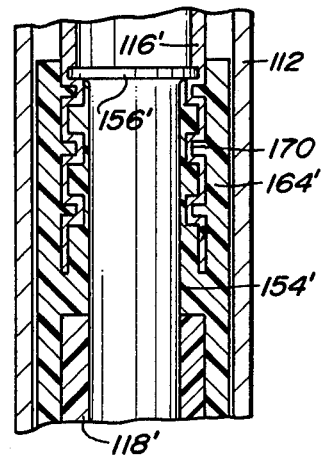
FIG. 10
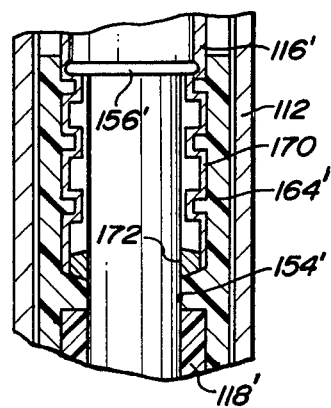
FIG. 11
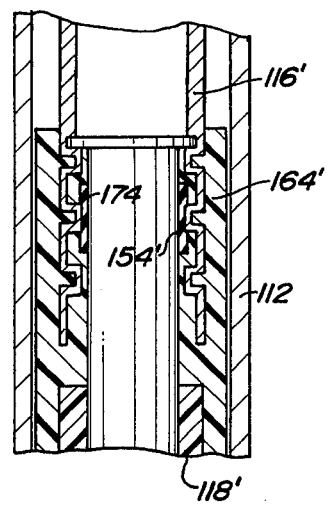
FIG. 12
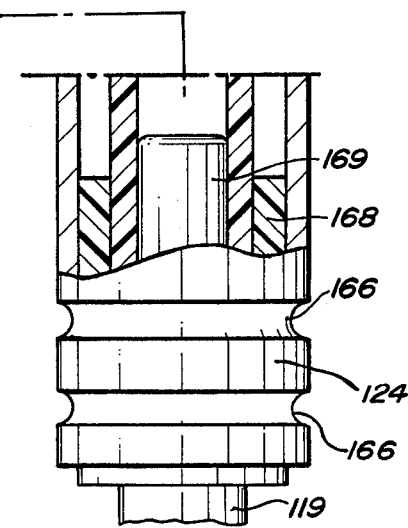

GAS RISER APPARATUS AND METHOD

CROSS REFERENCE TO RELATED APPLICATION

This is a continuation of application Ser. No. 495,200, filed Aug. 6, 1974.

This application is a continuation-in-part of application Ser. No. 349,681 filed Apr. 10, 1973.

BACKGROUND OF THE INVENTION

This application is directd to apparatus and method for conducting pressurized fluid from a source of supply to a delivery point. More particularly, this invention relates to apparatus and method for conducting pressurized fluid utilizing plastic pipe.

The underground transmission of natural gas and other such fluids is usually accomplished by means of heavy black steel pipe. More recently, however, the use of plastic pipe in gas applications has become more evident. Thus, there has developd a need for apparatus and methods by means of which pressurized fluid such as natural gas, propane, butane or other such fluids can be conducted from a source of supply to a point of delivery utilizing plastic pipe.

This invention is directed to apparatus and method by means of which plastic pipe may be utilized exclusively or in part to provide for a flow of natural gas from a gas main to a gas meter or other apparatus for introduction into a dwelling or other location where natural gas is utilized either as a fuel or for any other purpose.

This invention is also directed to a fitting for interconnecting two tubular members one of which is plastic.

In addition, this invention is directed to a double walled conduit apparatus and sealing structure for use in the transmission of pressurized fluid from a location below ground level to a point of delivery above ground level.

Still further, this invention is directed to a method for conducting pressurized fluid from a point below ground level to a point of delivery above ground level.

BRIEF DESCRIPTION OF THE INVENTION

Briefly described, the apparatus of this invention comprises a first tubular member with a second tubular member having at least a portion thereof received within the first tubular member. The first and second tubular members are concentric and generally define an annular space between such members. Sealing means is provided between said first and second tubular members. Such sealing means is defined by a seal member and seal member locating means. In the preferred embodiment the seal member locating means is comprised of confining wall means on either side of the seal member. A generally radially inwardly projecting rib extending from the first tubular member is defined in contact with the seal member in order to exert a compressive force on the seal member thereby providing for sealing between the first and second tubular members.

The second tubular member, in the preferred embodiment, is made up of a section of metallic pipe and a section of non-metallic pipe connected by a transition fitting. In an alternate embodiment the second tubular member is defined as a single section of nonmetallic pipe.

The method of this invention comprises the steps of:

(a) providing a nonmetallic tubular conduit adapted to be connected to a source of supply of pressurized fluid;

(b) providing a double walled riser element having an internal conduit, an external conduit, and sealing means;

(c) placing the nonmetallic tubular conduit below ground level to provide for the transmission of pressurized fluid from a source of supply to the end of such conduit;

(d) attaching one end of the internal conduit of the riser element to the tubular conduit at a position below ground level;

(e) attaching one end of the external tubular conduit of the riser element to a delivery point above ground level.

DESCRIPTION OF THE INVENTION

A more complete description of the invention will now be made with reference to the attached drawings, in which:

FIG. 1 is an elevational view, partly in section, showing an alternate embodiment of the apparatus of this invention;

FIG. 2 is an enlarged cross-sectional view of a portion of the apparatus as shown in FIG. 1;

FIG. 3 is an enlarged cross-sectional view of a portion of the apparatus shown in FIG. 1;

FIG. 4 is an enlarged cross-sectional view of a portion of the apparatus as shown in FIG. 1;

FIG. 5 is an exploded view, partly in section, showing the respective elements of the alternate embodiment of the apparatus of FIG. 1;

FIG. 6 is an elevational view, partly in section, showing a second alternate embodiment of the apparatus of this invention;

FIG. 9 is an enlarged cross-sectional view, partly in section, showing the preferred embodiment of the apparatus of this invention;

FIG. 10 is an enlarged cross-sectional view of an alternate embodiment of the transition fitting of the apparatus of this invention;

FIG. 11 is an enlarged cross-sectional view of a further alternate embodiment of the transition fitting of the apparatus of this invention; and FIG. 12 is an enlarged cross-sectional view of a still further alternate embodiment of the transition fitting of the apparatus of the invention.

DESCRIPTION OF THE PREFERRED EMBODIMENT

Figure 7:
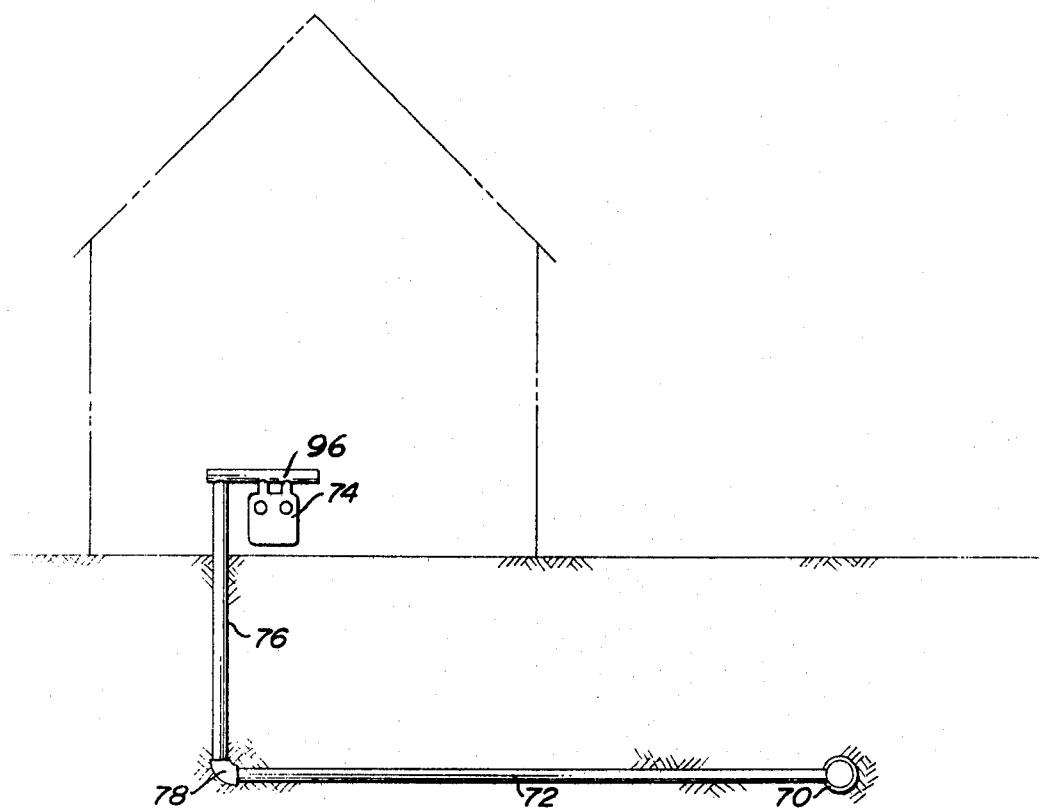
FIG. 7 is a schematic view showing one example of prior art apparatus providing for the transmission of pressurized gas from a main to a meter at a residence.

Reference is now made to FIG. 9 in which there is shown the preferred embodiment of the apparatus of this invention. The apparatus, which is broadly designated apparatus 110 in FIG. 9, is generally comprised of a first tubular member 112 and a second tubular member means 114. The second tubular member means 114 is, in the preferred embodiment of FIG. 9, made up of a metallic pipe or tube 116 and a nonmetallic pipe 118. These members are joined together by means of a transition fitting 120 which will be described in greater detail below.

In the preferred embodiment metallic tube 116 is fabricated from stainless steel and nonmetallic pipe 118 is fabricated from polyethylene. Obviously within the spirit of this invention should be considered alternate materials for either the tube 116 or the pipe 118.

Tubular member 112 is generally cylindrical and includes a first end 122 and a second end 124.

The member 112, which in the preferred embodiment is metal pipe, is provided with external threads 126 for the attachment of the member to either another conduit or to such apparatus as a gas meter or the like. It should be understood that within the spirit of this invention are other attachment means for securing tubular member 112 to other members.

The second end 124 of tubular member 112 is adapted to be disposed below ground as will become more evident as the description proceeds.

Tube 116 as shown in FIG. 9 is received within and is generally concentric with tubular member 112. At the upper end of tube 116 as shown in FIG. 9 the exterior surface thereof is provided with a series of annular grooves 128. Sleeves 130, 132 and 134 of polyethylene injection molded material are cast around the end of the tube. These sleeves define a pair of grooves 136, 138 for the reception of gasket seals 140, 142. When molded in place the sleeves 130, 132 and 134 tightly grip and adhere to the external surface of tube 116. The molding material fills the grooves 128 thus enhancing the locking of the sleeves with respect to tube 116.

It should be noted that polyethylene material has a tendency to shrink upon cooling. Such shrinkage serves to enhance the sealing and gripping of the external surface of tube 116 by the sleeves 130, 132 and 134.

The placement of generally radially inwardly directed ribs 144, 146 and 148 in tubular member 112 causes a compressive force to be exerted against the gasket seals 140 and 142 and the sleeve 134. The locking and sealing action of the ribs is achieved by rolling the respective members together by means of a die thus to distort or displace the metal of the tubular member 112 thereby to produce an inwardly extending annular rib or corrugation. In the preferred embodiment of FIG. 9 ribs 144 and 146 extend a degree sufficient to indent or displace material of the gasket seals 140, 142 in order to provide for sealing. Rib 148 similarly provides for sealing and locking of the members 112 and 134.

For a more complete description of the locking means producing the annular ribs 144, 146 and 148 reference is made to the Jacobson U.S. Pat. No. 3,093,161.

Sleeves 130, 132 and 134 together define locating means for the gasket seals 140, 142. These sleeves also define confining walls which serve to capture and retain the gasket seals in place. Stated in other terms the confining walls serve to locate the gasket seals while, in the preferred embodiment of FIG. 9, serving to confine the gasket seals at such time as a compressive force is exerted on the seal members by the placement of the ribs 144, 146.

Besides providing for seal member locating means the sleeves 130, 132 and 134, in the preferred embodiment of FIG. 9, also substantially fill the annular space 150 between the tube 116 and the tubular member 112 with the result that rigidity and support are provided for the internal tube 116 with respect to the external tubular member 112. This support enhances not only sealing but also make-up of the apparatus of the invention.

At a location below the upper sealing surfaces of the apparatus there is provided in the annular space 150 an insulation sleeve 152. In the preferred embodiment of FIG. 9 this sleeve is fabricated from plastic material and serves as insulation means to prevent direct contact of the tube 116 with the internal wall of the tubular member 112.

Turning now to the transition fitting 120 of the apparatus of this invention it will be seen from FIG. 9 that the metallic tube 116 is joined to the nonmetallic pipe 118 in a fluid tight relationship. Th transition fitting is made up of a nonmetallic sleeve 152 which is disposed within tube 116. A reinforcing steel stiffener member 154 is inserted within sleeve 152 and extends well into the nonmetallic pipe 118. The upper end of the stiffener member 154 as is shown in FIG. 9 is provided with a flange 156 which is received adjacent the end of the nonmetallic sleeve 152.

With the stiffener member 154 and nonmetallic sleeve 152 in place within tube 116 a plurality of ribs 153 are rolled into these members to provide for firm locking and sealing. Thereafter the free end of the stiffener member 154 is inserted into the nonmetallic pipe 18. A rubber gasket seal 160 having a radially extending sealing flange 162 is then put in place and the members 116, 118 are pushed together until contact is made with the sealing flange 162. As a final step in the make-up of the transition fitting 120 a sleeve 164 of polyethylene material is molded in place. As will be evident from FIG. 9 sleeve 164 is fused to a portion of the surfaces of pipe 118 and tube 116. In addition this sleeve is locked into the grooves 158 defined in the external surface of tube 116. Finally, sleeve 164, which tends to shrink upon cooling, exerts a tight compressive force against the sealing gasket 160.

Turning now to the lower portion of the apparatus of FIG. 9 the second end 124 of the tubular member 112 is provided with a plurality of generally annular inwardly extending ribs 166. These ribs contact sleeve 168 which is disposed between the external surface of pipe 118 and the internal surface of tubular member 112. In the preferred embodiment of FIG. 9 sleeve 168 is fabricated from thermoplastic material. In order to give rigidity to the pipe 118 a reinforcing steel stiffener member 169 is inserted within pipe 118 in the area of the ribs 166.

As will be noted in FIG. 9 portion 119 of pipe 118 extends from tubular member 112. The length of portion 119 is sufficient to permit the apparatus to be secured to a nonmetallic underground plastic conduit in a manner to be described more fully in connection with FIG. 8.

To gain an appreciation for the use of the apparatus of this invention in a gas riser application, reference will first be made to FIG. 7 in which there is shown schematically one example of prior art apparatus for the transmission of natural gas from a gas main to a gas meter or the like.

As is shown in FIG. 7 a source of pressurized fluid or natural gas is provided by means of a gas main 70. Individual users of natural gas receive gas by means of a conduit 72 extending from the gas main to the approximate location of the gas meter 74. A gas riser 76 provides for the flow of gas from pipe 72 to the gas meter 74. As will be evident from FIG. 7 the gas riser conducts gas from a point below ground level to a point above ground level.

Many gas utilities utilize metal pipe to conduct gas from the main to the meter. In some instances protective tape or protective nonmetallic coatings have been applied to the pipe in order to attempt to reduce corrosion. More recently the use of plastic pipe in gas applications has become more evident.

Plastic pipe is not as structurally rigid as is metal pipe. Its use in transmitting natural gas above ground level has not been readily adopted. There has been some concern expressed by gas utility companies and others that an exposed plastic pipe above ground is subject to fracture and abuse as a result of a direct impact by an object or temperature changes with the consequences that a gas leak develops.

It has been proposed to utilize plastic pipe for gas transmission in strictly below ground applications with a continued use of metal pipe for gas riser and above ground applications. Referring to FIG. 7 the use of an all metal gas riser 76 and an all plastic gas conduit 72 requires the placement of a metal-to-plastic pipe coupling at the joint 78 of these two members.

The apparatus of the preferred embodiment of this invention as shown in FIG. 9 provides for the transmission of natural gas from the main to the gas meter by means of plastic pipe below ground level and metallic pipe above ground level. The portion of the metallic gas conduit above ground level is completely encased in a steel pipe for added protection and support.

Figure 8:
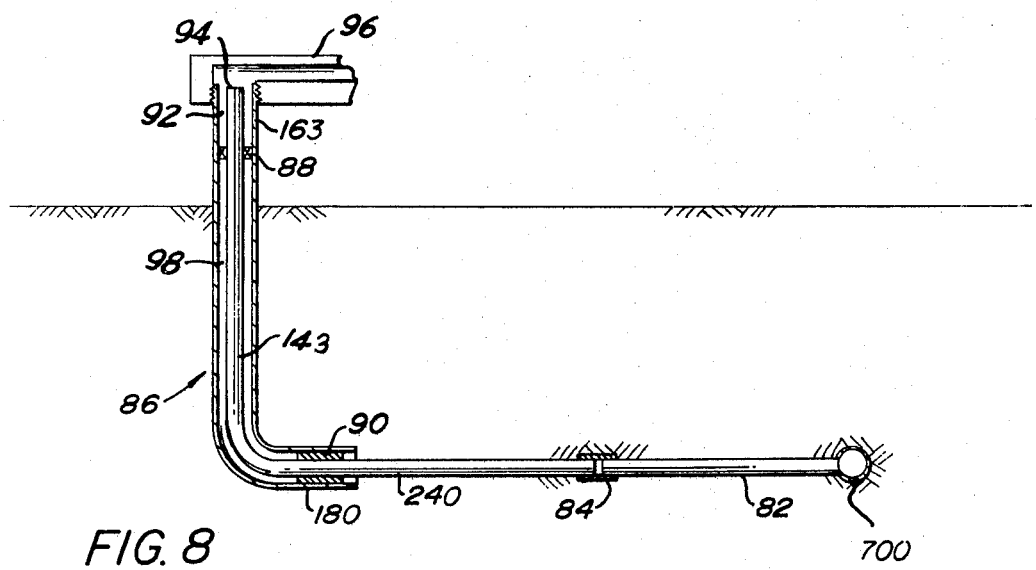
FIG. 8 is a schematic view showing the attachment of the gas riser apparatus of this invention to a gas meter and to an underground conduit.

Applicant's apparatus is shown schematically in FIG. 8. Therein it will be noted that plastic pipe 82 is utilized to conduct pressurized fluid from the main 700 to the joint 84. At this point the fluid is conducted by means of the pipe portion 240 extending from the gas riser 86. Pipe portion 240 in the schematic drawing of FIG. 8 corresponds to pipe portion 119 of FIG. 9. Riser 86 of FIG. 8 (which corresponds to apparatus 110 in FIG. 9) conducts fluid to the manifold 96 of the gas meter. The internal conduit 143 of FIG. 8 corresponds to the tube 116 and the pipe 118 of FIG. 9.

The external pipe 163 of FIG. 8 corresponds to the tubular member 112 of FIG. 9. Seal 88 of FIG. 8 corresponds to the gasket seals 140, 142 of FIG. 9. Joint 90 of FIG. 8 corresponds to the joint of FIG. 9 at the annular ribs 166.

It will be noted in the schematic of FIG. 8 that the end 94 of conduit 143 is not directly connectd to the point of delivery at the manifold 96. Rather the end of the outer pipe 163 is connected to the delivery point. Seal 88 limits the flow of fluid between the pipes such that the annular space 98 below seal 88 is not filled with pressurized fluid. Only the limited space 92 above the seal is pressurized. Seal 88 is located above ground level. Thus the outer conduit acts as a carrier of fluid only for a portion of its length above ground level and above seal 88.

In general, therefore, the outer conduit of the apparatus of this invention functions as a protective member for the internal conduit. It does not function as a carrier or conductor of pressurized fluid. Thus should any part of the outer conduit located below the sealing structure corrode there will be no escape of fluid since fluid integrity is maintained by the internal conduit and the sealing structure.

Turning now to FIGS. 10, 11 and 12 there are shown three modifications or alternate embodiments of the transition fitting interconnecting the tube 116 with the pipe 118. It should be understood that the transition fittings of FIGS. 10–12 are alternate embodiments of the transition fitting 120 of the preferred embodiment of FIG. 9.

In describing the structures of FIGS. 10–12 where possible common reference characters will be used as were provided in connection with the description of the preferred embodiment of FIG. 9.

Thus, in FIG. 10, there is shown an alternate embodiment of a transition fitting providing for the interconnection of the tube 116' and pipe 118'. The end of tube 116' is provided with a series of annular grooves 170. Disposed within the end of tube 116' and the adjoining end of pipe 228' is a metallic stiffener member 154' having a flange 156'. A polyethylene injection molded sleeve 164' surrounds the ends of the respective tube 116' and pipe 118' and provides for sealing and joining of these members.

The structure of FIG. 11 is very nearly similar to that of FIG. 10 with the exception of the fact that in FIG. 11 a stiffener ring 172 is brazed to tubing 16' for the purpose of adding rigidity to the tube end.

Similarly the structure of FIG. 12 is very nearly identical to that of FIG. 10 with the exception of the fact that the structure of FIG. 12 includes a rubber gasket seal 174.

Turning now to FIG. 1, there is shown an alternate embodiment of the apparatus of this invention comprising a first tubular member 12 and a second tubular member 14. As will be observed in FIG. 1, tubular member 12 is generally cylindrical and includes a first end 16 and a second end 18.

In the alternate embodiment of the invention as shown in FIG. 1, end 16 of tubular member 12 is provided with external threads 20 for the attachment of tubular member 12 to either another conduit or such apparatus as a gas meter or the like.

Tubular member 14 as shown in FIG. 1 has at least a portion thereof received within tubular member 12. That is to say, in the alternate embodiment as shown in FIG. 1, one end 22 of tubular member 14 is disposed within tubular member 12 with the remaining portion generally designated 24 extending outside of tubular member 12.

The portion of tubular member 14 disposed within tubular member 12 is generally concentric with tubular member 12 such that these two members define a generally annular space 26 therebetween.

Sealing means 30 is provided between said first and second tubular members in order to provide for sealing of these members.

An enlarged cross-sectional view of the sealing means between the tubular members is shown more clearly in FIG. 2. In FIG. 2 it will be observed that sealing means 30 is generally defined by a seal member 32 and seal member locating means 34. The function of seal member locating means 34 is to position seal member 32 within the first tubular member 12 such that the placement of a generally radially inwardly projecting rib 36 in tubular member 12 will cause a compressive force to be exerted against the seal member 32 with the result that sealing between the tubular members 12 and 14 is achieved.

Thus, upon placement of rib 36 in tubular member 12, the tubular members 12, 14 and the seal member 32 are firmly locked together as is shown in FIG. 2. This locking action is achieved by rolling the respective members together by means of a die thus to distort or displace the metal of the tubular member 12 thereby to produce an inwardly extending annular rib or corrugation 36. In the embodiment of FIG. 1 rib 36 extends a degree sufficient to indent or displace material or seal member 32 as well as tubular member 14. Similarly, in FIG. 2, internal sleeve 38 is indented by the rolling action that places rib 36 in tubular member 12.

The internal sleeve 38 is generally cylindrical and is disposed within the tubular member 14 for the purpose of providing internal support for the tubular member 14 since, in the embodiment of FIG. 1, this member is defined by a nonmetallic material such as plastic.

Attention will now be directed to the seal member locating means 34 which was previously described as means for locating the seal member 32 within tubular member 12 such that upon placement of the annular rib 36 in tubular member 12 a compressive force is exerted on seal member 32.

In the embodiment of the apparatus as shown in FIG. 2 the seal member locating means 34 is defined by a pair of generally cylindrical lands 42, 44 positioned substantially axially on either side of the seal member 32. Lands 42, 44 substantially fill the annular space 26 between tubular members 12 and 14. These lands further define confining walls 46, 48 which serve to capture and retain seal member 32 in place. Stated in other terms, the confining walls 46, 48 serve to locate the seal member 32 while, in the embodiment of FIG. 1 serving to confine the seal member at such time as a compressive force is exerted on the seal member by the placement of annular rib 36 in tubular member 12.

In the embodiment of FIG. 1 lands 42, 44 are interconnected by means of a relatively thin web 50. Web 50 thus cooperates with confining walls 46, 48 in order to define in section a generally U-shaped groove 58 (FIG. 5) into which seal member 32 is disposed.

As will be noted from FIG. 2, lands 42, 44 and web 50 are integral and are defined by parent material that is cast in place about tubular member 14. After casting, cylindrical lands 42, 44 and web 50 are firmly attached to tubular member 14 such that these members may be considered integral.

In fact, if desired, the seal member locating means may be defined as an integral portion of the inner tubular member as is shown more clearly in the alternate embodiment of FIG. 6. That is to say, the seal member locating means 34' may, as is shown in FIG. 6, be defined integral with tubular member 14' at the time tubular member 14' is formed.

In the embodiment of FIG. 1, however, tubular member 14 is comprised of plastic pipe with a generally smooth external surface. Seal member locating means 34 is, in turn, cast in place about tubular member 14 at a preferred location in order to provide a seal member locating means 34 for seal member 32.

In casting seal member locating means 34 about tubular member 14 it has been found that a virtual fluid tight seal is accomplished between these members as fusion of materials takes place at the area of joinder.

Also to be considered within the scope of this invention is structure in which the cylindrical lands 42, 44 are attached to the tubular member 14 by joining means well known to those skilled in the art including the use of adhesives, plastic welding and other such techniques.

Turning now to the interior of tubular member 14 it wil be seen in FIGS. 1 and 2 that an internal sleeve 38 is provided in close contact with the internal wall of tubular member 14. Since, in the embodiment as shown in FIG. 2 tubular member 14 is a nonmetallic member, preferably fabricated from plastic, internal sleeve 38 functions as a stiffening member to provide support for tubular member 14 as the apparatus is made up.

As may be seen in FIG. 5, internal sleeve 38 is generally cylindrical in shape and has an outside diameter slightly less than the internal diameter of tubular member 14. A lip 54 is provided at one end of sleeve 38 such that when inserted into tubular member 14 lip 54 will contact the end of tubular member 14 thus serving to limit the degree of insertion of sleeve 38 into tubular member 14.

In the embodiment of FIG. 1 sleeve 38 is fabricated from rigid material such as steel. Equivalent materials well known to those skilled in the art may also be utilized and should be considered within the spirit of this invention.

Sealing of the fitting of this invention is achieved upon the placement of the rib or corrugation 36 in tubular member 12. As will be noted in FIG. 2, rib 36 forms an indentation in seal member 32 as the rib exerts a compressive force on the seal member. In turn, an indentation is formed in web 50, tubular member 14, and internal sleeve 38. Thus, upon forming rib 36 in tubular member 12 all of the elements of the fitting including seal member 32, tubular member 14 and sleeve 38 are firmly locked together.

The application of a compressive force on seal member 32 causes this member to expand into tight sealing engagement with all surfaces surrounding the seal member. Thus, seal member 32 is caused to be brought into sealing engagement with internal wall 56 of tubular member 12, confining walls 46, 48 and web 50. Since web 50 is, in turn, in sealing engagement with tubular member 14, the application of a compressive force on seal member 32 as shown in FIG. 2 produces complete sealing between the tubular members 12 and 14.

While in the embodiment of FIG. 1 the placement of rib 36 in tubular member 12 produces complementary indentations in all of the members 32, 14 and 38, it should be understood that depending upon the depth of the rib 36 an indentation may or may not be formed in tubular member 14 and sleeve 38. Since the function of rib 36 is to apply a compressive force to seal 32, the depth of rib 36 should be sufficient such that the degree of force imparted to seal 32 enables the seal to provide tight sealing engagement with the internal surface of tubular member 12 and other surfaces of the fitting to provide operative sealing at the tubular member 14. By other surfaces is meant surfaces of tubular member 14 itself or surfaces in sealing contact with tubular member 14.

In the embodiment of the fitting as shown in FIG. 1 a pair of seal members 32, 32' are positioned in axially spaced relation between the tubular members 12 and 14. Similarly, a pair of annular ribs 36, 36' are defined in tubular member 12 in order to provide for locating and sealing of the various elements of the fitting. By using a pair of seal members overall sealing of the entire fitting assembly is enhanced as a backup seal is thereby provided.

As will be noted in FIG. 1, a land 60 is provided adjacent seal member 32'. Land 60 cooperates with land 44 to provide seal member locating means for seal member 32' in much the same manner as lands 42, 44 cooperate with seal member 32 to provide for seal member locating means for such seal member.

As will be noted from FIG. 1, a third annular rib 36" is provided in tubular member 12. Rib 36" defines an indentation in cylindrical land 60 as well as tubular member 14 and sleeve 38. Rib 36" thus serves to firmly lock the elements 12, 60, 14 and 38 together.

It will be noted from FIG. 1 that internal sleeve 38 extends below land 60 such that the entire portion of tubular member 14 in the area of seal members 32, 32' is supported by sleeve 38. In addition, support for tubular member 14 in the vicinity of land 60 is provided by the sleeve.

While seals, 32, 32' provide for primary and secondary sealing of the fitting, it should be appreciated that a certain degree of sealing is achieved at rib 36" as this rib makes sealing contact with land 60. In turn, land 60 makes sealing contact with tubular member 14 as complementary indentations are defined in tubular member 14 and sleeve 38 by rib 36".

Besides providing for seal member locating means, lands 42, 44, and 60, in the embodiment of FIG. 1 also substantially fill annular space 26 between the tubular members 12 and 14 with the result that rigidity and support are provided for the internal tubular member 14 with respect to the external tubular member 12. This support enhances not only sealing but also make-up of the fitting.

In FIG. 5 there is shown an exploded view of the several elements of the fitting of the embodiment of FIG. 1. A pair of grooves 58 and 62 are defined by lands 42, 44, 60 in order to receive seal members 32 and 32'. The seal members, formed from any suitable elastomeric material, are passed over land 42 and are seated in respective grooves 58, 62. Thereafter, the subassembly including tubular member 14, the seal member locating means and the seal members themselves is then inserted into tubular member 12 until the inner end of tubular member 14 is approximately adjacent end 16 of tubular member 12. Either before or after the insertion of tubular member 14 into tubular member 12 the internal sleeve 38 is inserted into tubular member 14 to such an extent that lip 54 is in contact with the outer end of tubular member 14.

After the various parts of the fitting have been assembled the ribs 36, 36' and 36" are then formed in tubular member 12 in a predetermined axial relationship as shown in FIG. 1. Once the ribs 36 and 36' are placed in tubular member 12, a compressive force is exerted against seal members 32, 32' as previously described. Furthermore, a compressive force is applied to cylindrical land 60 by rib 36" as previously described. The overall result is a fitting in which there is provided not only a firm securing of tubular members 12 and 14 together but also sealing between these parts.

It should be understood that in use the gas riser of this invention provides for a portion of the riser to be exposed above ground level with a portion to be positioned below ground level. Thus, the first end 16 of tubular member 12 of the embodiment of FIG. 1 is adapted to be secured to the gas meter or other apparatus located above ground level. The second end 18 of tubular member 12 of the embodiment of FIG. 1 is adapted to be received below ground level. Portion 24 of tubular member 14 extending from tubular member 12 is adapted to be disposed below ground level. Thus since portion 24 is disposed below ground level there is alleviated the concern normally incident to the exposure of plastic pipe.

In the preferred embodiment of FIG. 9 the internal tubular member of the apparatus is fabricated from metal and plastic pipe interconnected by a transition fitting. In the alternate embodiment of FIG. 1 the internal tubular member is all plastic material. When the preferred embodiment of FIG. 9 is used the transition fitting 120 is located below ground level. The internal pipe of FIG. 9, above ground level, is all metal.

The gas riser apparatus as shown in FIGS. 1 and 9 may take several different shapes depending upon the particular gas installation desired. The gas riser may either assume a straight configuration as shown in FIG. 1 of FIG. 9 or it may assume the shape of an elbow, or bend as shown schematically in FIG. 8. Similarly, the length of the riser may vary depending upon local usage. Also, the length of the exposed internal pipe, i.e., the length of the exposed portion of the inner tubular member (119 in FIG. 9) may vary depending upon particular customer requirements. If desired the exposed portion of the inner tubular member may be sufficiently long to be connected directly to the main.

Where the gas riser is long it may be considered desirable to provide for one or more intermediate lands in the annular space between the inner and outer tubular members to provide for greater support of the inner tubular member within the outer tubular member. Similarly, it may be considered desirable to provide for regular placement of annular ribs along the entire length of the outer tubular member in order to provide for greater rigidity and support of the internal tubular member. Such ribs also prevent "pull out" of the internal member.

In FIGS. 3 and 4 there is shown an exploded cross-sectional view of the second end of the tubular member 12. In FIG. 3 land 60' is shown between the outer tubular member 12 and the inner tubular member 14. As has previously been described, land 60' is, in the embodiment of FIG. 1, cast in place about tubular member 14 and, as a result, land 60' may be considered very nearly integral with tubular member 14. A slight amount of flash 80 is provided at the end of the land in order to both assist in the sealing of land 60' with respect to tubular member 14 and also to reduce any likelihood of land 60' cutting into the surface of tubular member 14 as tubular member 14 is flexed within land 60'.

In FIG. 4 the end configuration of the gas riser apparatus of FIG. 1 is shown. Land 60' extends outside of tubular member 12. Internal tubular member 14 extends outside of land 60' a degree sufficient to provide for the attachment of this member with other suitable conduit or a main as previously described. As previously noted in connection with FIG. 3, flash 80 is utilized in order to enhance sealing between the land 60' and tubular member 14.

Also there is shown in FIGS. 3 and 4 an internal sleeve 38 which, while not absolutely necessary, aids in the establishment of greater rigidity between the respective members of the conduit as support is imparted to the internal tubular member 14.

In FIGS. 2, 3 and 4 it should be noted that the lands substantially fill the annular space between the tubular members 12 and 14. Such configuration of the lands contributes to improved rigidity of the apparatus. It should not be considered limiting, however, to the scope of the invention.

The Method Described

Attention will now be directed to a description of the method of this invention for conducting pressurized fluid from a source of supply below ground level to a delivery point above ground level. The method of this invention comprises the following steps:

(a) Providing a nonmetallic tubular conduit adapted to be connected to a source of supply of pressurized fluid. This conduit is shown schematically as conduit 82 in FIG. 8.

(b) Providing a double walled riser element having an internal conduit, an external conduit and sealing means. The riser element is shown as gas riser 86 in FIG. 8. The sealing means is shown at 88.

(c) Placing the nonmetallic tubular conduit below ground level to provide for the transmission of pressurized fluid from a source of supply to the end of the conduit. The positioning of this tubular conduit is shown schematically in FIG. 8 below ground level and extending from the gas main 700 to a position approximately beneath the gas meter.

(d) Attaching one end of the internal conduit of the riser element to the tubular conduit at a position below ground level. Referring to FIG. 3 the attachment is made by securing portion 240 to the below grade conduit 82 using attachment means previously described or other well known attachment means. In FIG. 8 the attachment means is shown at 84.

(e) Attaching one end of the external tubular conduit of the riser element to a delivery point above ground level in a manner such that the sealing means (shown at 88 in FIG. 8) is disposed above ground level. In the schematic view of FIG. 8 the end of pipe 163 of riser 86 is attached to a delivery point which has been shown as a gas manifold 96.

As an expansion of the method step (b) above the double walled riser element can be provided in two forms:

(1) the riser element can be provided with a metallic external conduit with a combination metal-plastic internal conduit; or (2) the riser element can be provided with a metallic external conduit with a plastic internal conduit.

The apparatus of (1) above is shown in FIG. 9. The apparatus of (2) is shown in FIG. 1.

In the placement of the apparatus designated (1) above (the FIG. 9 apparatus) the metal internal conduit is placed generally above ground level and the plastic internal conduit is placed below ground level. The transition fitting between the two conduits (metal and plastic) is placed below ground level.

Advantages of the Invention

Several of the advantages of the invention will now be described.

Referring to the embodiment of FIG. 9, the preferred embodiment, it will be noted that within the riser apparatus plastic pipe is fused to metallic pipe. The portion of the riser conduit apparatus located above ground level is all metallic in construction.

Referring to the modified embodiment of FIG. 1 it will be noted that plastic pipe is utilized to conduct pressurized fluid from the main to the point of delivery above ground level. The portion of plastic pipe above ground level, however, is encased by a protective metal conduit 12.

In general, therefore, the metal outer conduit of the riser functions as a protective member for the internal pipe. It does not function as a carrier or conductor of pressurized fluid below the sealing structure.

Modifications of the Invention

Several modifications of the invention are possible and should be considered within the spirit of the invention.

Referring to FIG. 8 the seal 88 can be located at any location at or above ground level. It is preferred that seal 88 not be positioned below ground level for the reason that the external tubular conduit 163 will then act as a gas carrier below ground level. Any corroding of conduit 163 below ground level would result in the flow of gas to atmosphere in this situation.

The length of the exposed portion 240 of the riser may vary according to user requirements. The portion 240 could even extend to the main 700 (FIG. 8) providing for a unitary conductor from the main to the delivery point.

The gas riser apparatus of this invention can be connected to any type of conduit including metal conduits. Thus the riser could be connected to a metallic conduit such as conduit 72 in FIG. 7 using any well known pipe joint.

While a single seal 88 is shown in FIG. 8, multiple seals may be employed including a single back-up seal as is shown in FIG. 1. Even more seals may be employed if necessary. Similarly, multiple restraining and support means may be utilized to retard "pull out" of the internal conduit from the external conduit.

The use of an internal supporting sleeve such as 38 in FIG. 1 should be considered optional depending on conditions. Similarly the use of the lip 54 on sleeve 38 should be considered optional.

The gas riser apparatus and method of this invention are applicable to any pressurized fluid application including natural gas, propane, butane and other gases.

The pipe threads 126 at end 122 of tubular member 112 of FIG. 9 are preferred although other attaching means should be considered within the spirit of the invention.

Finally it should be noted that the gas riser apparatus of this invention eliminates the requirement for anodic protection of the metallic conduit below ground level. It is common to provide either a zinc or magnesium anode at an underground metallic conduit in order to reduce corrosion of such conduit. Since, however, the portion of the metallic conduit below ground level of the riser apparatus of this invention is not a gas carrier, there is no need for anodic protection for the conduit. As has previously been noted, a break in the wall of the metal outer conduit below ground level (as caused for example by corrosion) will not result in leakage of gas in the apparatus of this invention since the external conduit is not a gas carrier.

What is claimed is:

1. A double-walled riser apparatus for conducting fluid from a non-metallic service line disposed below ground level to a point of delivery at a member above ground level, said apparatus comprising in combination:

a tubular element having a first end and a second end, said first end being adapted to be disposed above ground level there being provided means at said first end to connect said tubular element to a delivery member, said tubular element having a sufficient length such that said second end thereof is disposed below ground level;

fluid conducting means having a first end and a second end, said first end of said fluid conducting means being disposed within said tubular element, said fluid conducting means extending through said tubular element to said second end thereof;

sealing means between said tubular element and said fluid conducting means;

said sealing means coacting with said tubular element and said fluid conducting means;

said tubular element being defined by a metallic member;

said fluid conducting means being defined, at the second end thereof, by a non-metallic tubular member, there being provided means at said second end of said fluid conducting means to interconnect said fluid conducting means to a nonmetallic service line disposed below ground level;

whereby, fluid from a buried non-metallic service line may be conducted to a delivery member above ground level by means of said fluid conducting means, the portion of said fluid conducting means located above ground level being protected by said tubular element, said sealing means prohibiting the flow of gas between said tubular element and said gas conducting means at a location below said sealing means.

2. A system for conducting fluid from a source below ground level to a delivery point above ground level, said system comprising in combination:

a non-metallic service line disposed below ground level and in communication with a source of fluid;

a delivery member above ground level;

a double walled riser apparatus for interconnecting said non-metallic service line and said delivery member, said riser apparatus comprising in combination:

an outer tubular conduit having a first end and a second end, said first end of said outer tubular conduit being adapted to be disposed above ground level, connection means at said first end to interconnect said outer tubular conduit to said delivery member, said outer tubular conduit having a sufficient length such that said second end thereof is disposed below ground level;

said outer tubular conduit being defined by a metallic member;

inner fluid conducting conduit means having a first end and a second end, said first end of said inner fluid conducting means being disposed within said outer tubular conduit, said inner fluid conducting conduit means extending through said outer tubular conduit to said second end thereof;

sealing means between said outer tubular conduit and said inner fluid conducting means, said sealing means coacting with said outer tubular conduit and said inner fluid conducting means;

said inner fluid conducting conduit means being defined, at the second end thereof, by a non-metallic tubular member, connection means at said non-metallic tubular member of said inner fluid conducting conduit means to interconnect said inner fluid conducting conduit means to said nonmetallic service line;

said inner fluid conducting conduit means defining a fluid tight conducting path from said second end thereof to said first end thereof;

whereby, fluid from a source below ground level may be conducted to said delivery member above ground level, the portion of said inner fluid conducting conduit means located above ground level being protected by said outer tubular conduit.

* * * * *